United States Patent [19]

Kuo et al.

[11] Patent Number: 5,355,296
[45] Date of Patent: Oct. 11, 1994

[54] SWITCHING CONVERTER AND SUMMING TRANSFORMER FOR USE THEREIN

[75] Inventors: Ming Kuo, Caldeonia; P. John Dhyanchand, Rockford, both of Ill.

[73] Assignee: Sundstrand Corporation, Rockford, Ill.

[21] Appl. No.: 988,625

[22] Filed: Dec. 10, 1992

[51] Int. Cl.$^5$ .................... H02M 7/5387; H02M 1/12
[52] U.S. Cl. ....................................... 363/43; 363/71; 336/182
[58] Field of Search ...................... 363/43, 71, 98, 132, 363/64; 336/180, 182, 170, 184, 188

[56] References Cited

U.S. PATENT DOCUMENTS

| | | | |
|---|---|---|---|
| Re. 28,986 | 9/1976 | Heinrich et al. | 321/5 |
| 2,127,232 | 8/1938 | Nichols | 175/363 |
| 2,137,433 | 11/1938 | Wirz | 171/119 |
| 2,418,643 | 4/1947 | Huge | 172/281 |
| 2,644,109 | 6/1953 | Mulder | 315/141 |
| 3,221,280 | 11/1965 | Malsbary et al. | 336/5 |
| 3,241,048 | 3/1966 | Lee | 323/44 |
| 3,271,654 | 9/1966 | Schlabach | 321/5 |
| 3,531,708 | 9/1970 | Kuba | 321/5 |
| 3,611,224 | 10/1971 | Becker | 336/5 |
| 3,657,633 | 4/1972 | Urish | 321/9 A |
| 3,675,037 | 7/1972 | Hamilton | 307/51 |
| 3,775,662 | 11/1973 | Compoly et al. | 321/5 |
| 3,943,429 | 3/1976 | Heintze | 321/26 |
| 4,112,403 | 9/1978 | Friedlander | 336/12 |
| 4,131,936 | 12/1978 | Gemp | 363/43 |
| 4,159,513 | 6/1979 | Gemp et al. | 363/43 |
| 4,274,071 | 6/1981 | Pfarre | 336/12 |
| 4,488,136 | 12/1984 | Hansen et al. | 336/215 |
| 4,549,258 | 10/1985 | Honbu et al. | 363/71 |
| 4,634,958 | 1/1987 | Cornwell | 323/255 |
| 4,678,986 | 7/1987 | Barthelemy | 323/343 |
| 4,698,739 | 10/1987 | Paice | 363/71 |
| 4,802,079 | 1/1989 | Mizoguchi | 363/71 |
| 4,837,497 | 6/1989 | Leibovich | 323/347 |
| 4,853,664 | 8/1989 | Asakura | 336/12 |
| 4,882,120 | 11/1989 | Roe et al. | 363/98 |
| 4,947,100 | 8/1990 | Dhyanchand et al. | 322/10 |
| 4,968,926 | 11/1990 | Dhyanchand | 322/10 |
| 4,975,822 | 12/1990 | Lipman | 363/40 |
| 5,008,801 | 4/1991 | Glennon | 363/132 |
| 5,027,265 | 6/1991 | Dhyanchand et al. | 363/43 X |
| 5,031,086 | 7/1991 | Dhyanchand et al. | 363/43 X |
| 5,040,105 | 8/1991 | Dhyanchand et al. | 363/43 |
| 5,041,957 | 8/1991 | Dhyanchand et al. | 363/43 |
| 5,041,958 | 8/1991 | Dhyanchand et al. | 363/43 |
| 5,057,808 | 10/1991 | Dhyanchand | 363/43 X |
| 5,138,544 | 8/1992 | Jessee | 363/43 |
| 5,177,460 | 1/1993 | Dhyanchand et al. | 363/43 X |
| 5,182,535 | 1/1993 | Dhyanchand | 363/43 X |
| 5,191,518 | 3/1993 | Recker et al. | 363/71 |
| 5,198,971 | 3/1993 | Recker et al. | 363/71 |
| 5,212,629 | 5/1993 | Jessee | 363/98 X |
| 5,225,973 | 7/1993 | Patel et al. | 363/43 |
| 5,239,454 | 8/1993 | Dhyanchand | 363/43 |

FOREIGN PATENT DOCUMENTS

| | | | |
|---|---|---|---|
| 725313 | 1/1966 | Canada | 336/41 |
| 892183 | 8/1953 | Fed. Rep. of Germany . | |
| 922894 | 12/1954 | Fed. Rep. of Germany . | |
| 1044262 | 11/1958 | Fed. Rep. of Germany . | |
| 1065929 | 9/1959 | Fed. Rep. of Germany . | |
| 2347646 | 4/1975 | Fed. Rep. of Germany . | |
| 1285901 | 1/1962 | France . | |
| 54-50823 | 4/1979 | Japan . | |
| 56-74909 | 6/1981 | Japan . | |
| 1-179405 | 7/1989 | Japan . | |
| 208247 | 4/1940 | Switzerland . | |
| 350095 | 6/1931 | United Kingdom . | |
| 423618 | 2/1935 | United Kingdom . | |
| 907338 | 10/1962 | United Kingdom . | |

*Primary Examiner*—Emanuel T. Voeltz
*Attorney, Agent, or Firm*—Marshall, O'Toole, Gerstein, Murray & Bicknell

[57] ABSTRACT

A switching converter includes first and second controllable switches, a power source coupled to the switches and a closed flux path. First and second primary windings are mutually inductively coupled through the closed flux path and are coupled to the first and second controllable switches, respectively. The first and second switches are operated together in synchronism and a secondary winding is inductively coupled with but electrically isolated from the first and second primary windings through the closed flux path. Each switch conducts only a portion of the power produced in the secondary winding and the problems of current sharing are avoided. Also, DC content that may be produced by the switches is blocked from the output.

15 Claims, 3 Drawing Sheets

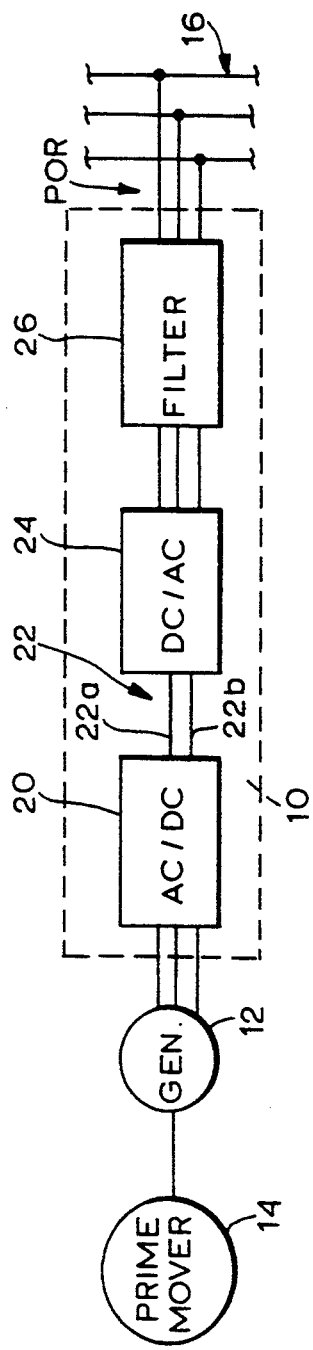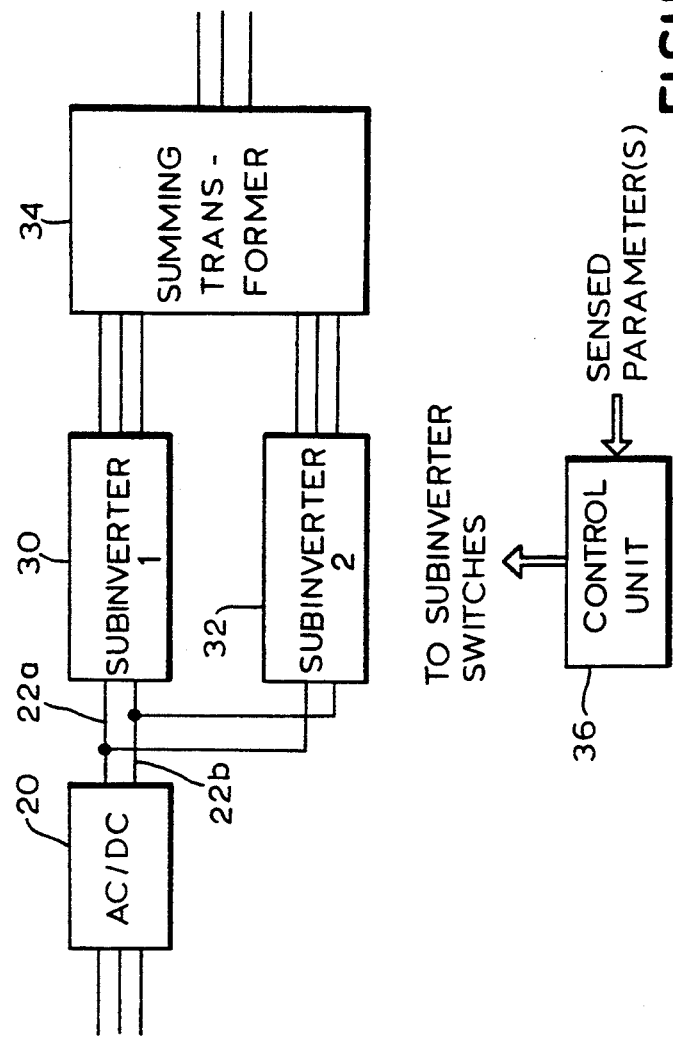

SWITCHING CONVERTER AND SUMMING TRANSFORMER FOR USE THEREIN

TECHNICAL FIELD

The present invention relates generally to a switching converters and more particularly to a switching converter wherein the outputs of two or more switching devices are combined.

BACKGROUND ART

In a power conversion system such as a variable-speed, constant-frequency (VSCF) power generating system, a brushless, three-phase synchronous generator converts variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

Prior VSCF systems have utilized either a pulse-width modulated (PWM) inverter or an inverter of the stepped waveform type. In either case, in order to obtain sufficient voltage and current handling capabilities, it has been found necessary to connect power switches in parallel to the load. As is generally known, operating semiconductor switching devices in parallel presents significant difficulties. Specifically, the characteristics of these devices must be carefully matched to insure that the currents handled by the devices are shared as equally as possible so that the potential for damage or destruction of the switches is minimized.

Inverters have been designed wherein first and second power switches are connected to end terminals of an interphase transformer having a mid-tap at which an output is produced. The interphase transformer is designed so that the output voltage at the mid-tap is at a level intermediate the voltages applied by the switches. In this type of inverter, each switch handles only a portion of the total output current magnitude. Patents disclosing such inverters include Urish, U.S. Pat. No. 3,657,633, Heintze, U.S. Pat. No. 3,943,429, Honbu, et al., U.S. Pat. No. 4,549,258 and Mizoguchi, U.S. Pat. No. 4,802,079.

Glennon, U.S. Pat. No. 5,008,801 discloses a VSCF power conversion system using an output autotransformer having first and second winding portions coupled to first and second switches, respectively, wherein the first and second winding portions are connected together at a common junction and wherein a secondary winding is connected between the junction and a particular potential. The first and second switches are operated in unison and the first and second windings act like an interphase transformer to balance the currents flowing in the associated switches.

While interphase transformers are effective to balance currents flowing through parallel connected switches, such reactors permit DC content to reach loads connected thereto. Such DC content may arise, for example, from asymmetrical switching of the inverter switches. This DC content is objectionable and should be eliminated, if possible. Systems and methods have been developed to eliminate DC content in the output of an inverter, such as the system disclosed in Roe, et al., U.S. Pat. No. 4,882,120; however, these types of systems introduce complexity into the inverter control since such systems rely upon adjustment of the operation of the inverter switches to eliminate this DC content.

SUMMARY OF THE INVENTION

In accordance with the present invention, a switching converter utilizes parallel connected switching devices but does not encounter current sharing problems nor does it permit the generation of DC content in the converter output.

More particularly, according to one aspect of the present invention, a switching converter includes first and second controllable switches, a power source coupled to the switches and a closed flux path. First and second primary windings are mutually inductively coupled through the closed flux path. The first and second primary windings have first ends coupled to the first and second switches, respectively, and second ends that are coupled together at a junction. Means are coupled to the switches for operating the switches together in synchronism wherein each switch conducts a switch current between the power source and the junction such that the switch currents are summed at the junction. A secondary winding is inductively coupled with but electrically isolated from the first and second primary windings through the closed flux path.

According to this aspect of the present invention, third and fourth switches may be coupled between the power source and third and fourth primary windings wherein the third and the fourth primary windings are mutually inductively coupled through a further closed flux path and wherein the operating means operates the third and fourth switches together in synchronism.

In accordance with one embodiment of the present invention, the secondary winding is inductively coupled with the third and fourth primary windings through the further closed flux path. Also in accord with this embodiment, the first named closed flux path is disposed in a first core and the further closed flux path is disposed in a second core.

In accordance with a further embodiment of the present invention, the third and fourth primary windings are coupled together at the junction and an additional secondary winding is inductively coupled with the third and fourth primary windings through the further closed flux path. Also in this embodiment, the first named closed flux path is preferably disposed in a first portion of a core and the further closed flux path is disposed in the second portion of the core.

In either embodiment, the third and fourth switches are preferably operated at a particular phase displacement with respect to the first and second switches.

In accordance with a further aspect of the present invention, a switching converter includes a power source, first and second switches coupled to the power source and a transformer having first and second primary windings wound on and mutually inductively coupled by a core and coupled to the first and second switches, respectively, and a secondary winding wound on the core wherein the secondary winding is inductively coupled to but electrically isolated from the primary windings. A switch controller operates the switches together in synchronism whereby the first and second switches couple the power source to the first and second primary windings and produce first and second powers therein, respectively, and wherein the first and second powers are summed in the secondary winding.

In accordance with yet another aspect of the present invention, a stepped waveform inverter includes first through twelfth controllable switches arranged in six switch pairs and first through twelfth primary windings having first and second ends wherein the first ends of the first through twelfth primary windings are coupled to the first through twelfth switches, respectively, and the second ends of the first through sixth primary windings are connected together. The second end of each of the seventh through ninth primary windings is connected to the first end of one of the seventh through ninth primary windings and the second end of each of the tenth through twelfth primary windings is connected to the first end of one of the tenth through twelfth primary windings. Means are provided for mutually inductively coupling the first and second primary windings together, the third and fourth primary windings together, the fifth and sixth primary windings together, the seventh and eighth primary windings together, the ninth and tenth primary windings together and the eleventh and twelfth primary windings together. First, second and third secondary windings are disposed on the coupling means and the coupling means inductively couples the first through third secondary windings to the first through twelfth primary windings. Means are provided for operating the switches of each switch pair together in synchronism whereby rectangular waveforms are produced in the primary windings and the rectangular waveforms are summed in the secondary windings.

In accordance with a still further aspect of the present invention, a summing transformer includes first and second cores each having first, second and third legs and a pair of primary windings disposed on each leg of the cores. The primary windings of each pair disposed on the first core have first ends adapted to receive AC power and second ends coupled to one another. A first primary winding of each pair disposed on the second core is connected in a delta configuration with the first primary windings of the remaining pairs disposed on the second core. A second primary winding of each pair disposed on the second core is connected in a delta configuration with the second primary windings of the remaining pairs disposed on the second core. Junctions between the first primary windings and between the second primary windings disposed on the second core are adapted to receive AC power. First, second and third secondary windings are disposed on the first, second and third legs of the first and second cores, respectively.

The present invention permits relatively low power switching devices to be parallelled so that high power levels can be developed for loads. In addition, DC content in the output power is eliminated without the need for additional complexity in the converter control.

BRIEF DESCRIPTION OF THE DRAWINGS

FIG. 1 comprises a block diagram of a generator and VSCF power conversion system for converting variable-speed motive power produced by a prime mover into constant-frequency AC power;

FIG. 2 is a block diagram illustrating the DC/AC converter of FIG. 1 in greater detail;

DESCRIPTION OF THE PREFERRED EMBODIMENTS

Figure 3:
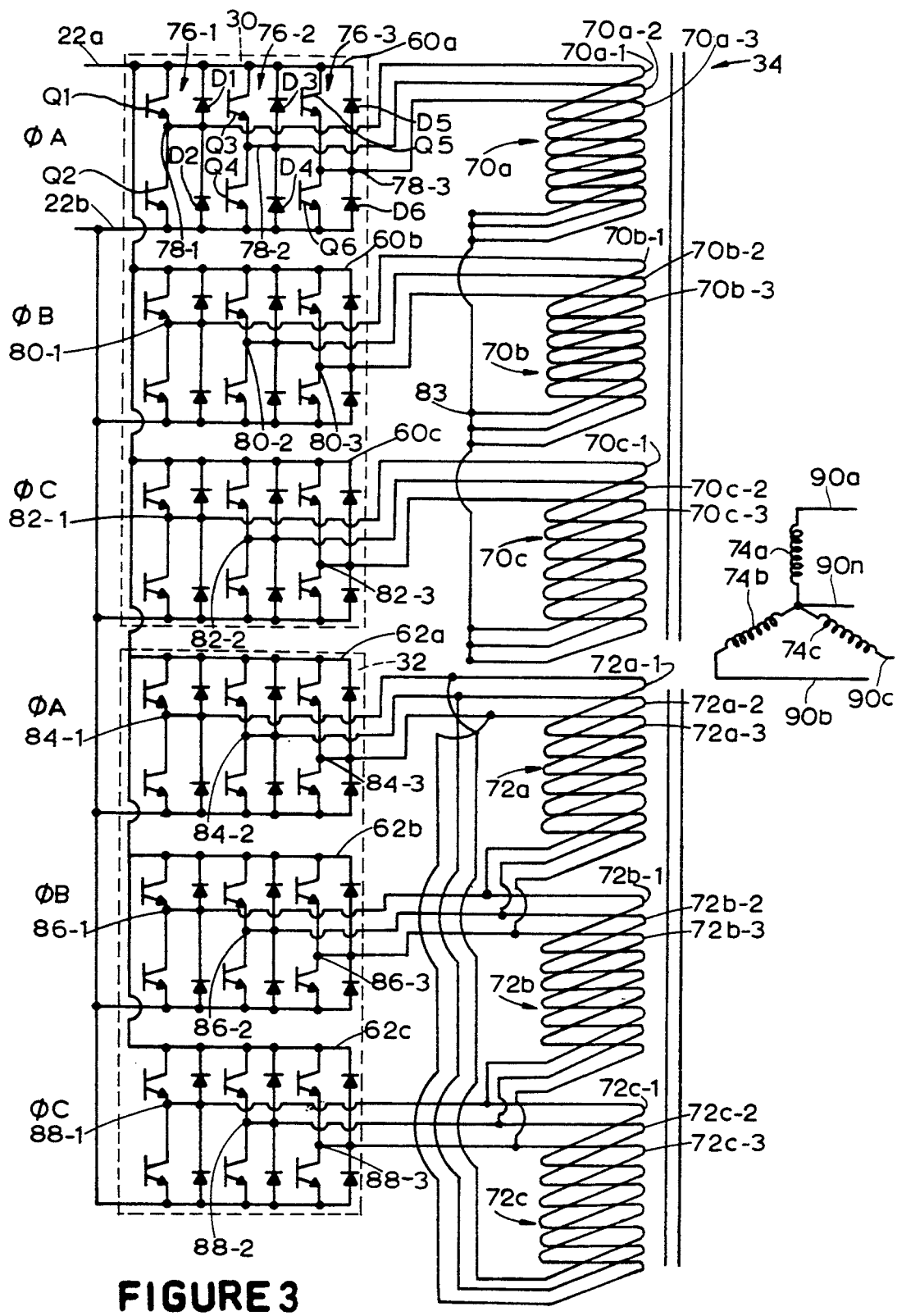
FIG. 3 comprises a simplified schematic of the subinverters and summing transformer of FIG. 2.

Referring now to FIG. 1, a variable-speed constant-frequency (VSCF) system 10 and a brushless, synchronous generator 12 together convert variable-speed motive power produced by a prime mover 14, such as an aircraft jet engine, into constant-frequency electrical AC power on an AC load bus 16. It should be noted that contactors located between the VSCF system 10 and the AC load bus 16 are not shown for the sake of simplicity.

The VSCF system 10 includes an AC/DC converter 20 which converts the variable-frequency power produced by the generator 12 into DC power on a DC link 22 comprising first and second DC link conductors 22a, 22b. The DC link conductors 22a, 22b are coupled to a DC/AC converter or inverter 24 which may be of the stepped waveform type. The inverter 24 converts the DC power on the DC link 22 into single or polyphase constant-frequency AC power which may be filtered by an optional filter 26 and provided to the load bus 16.

Referring now to FIG. 2, the inverter 24 preferably includes first and second subinverters 30, 32, which are coupled to the DC link conductors 22a, 22b. The subinverters 30, 32 develop single or polyphase rectangular waveforms which are summed by a summing transformer 34 to produce the constant-frequency AC power. In the preferred embodiment, the subinverters 30, 32 develop three-phase rectangular waveforms and three-phase power is produced by the summing transformer 34, although a different number of phases may be produced by the subinverters 30, 32 and the summing transformer 34, if desired. As noted in greater detail hereinafter, the subinverters 30, 32 include controllable power switches that are operated by a control unit 36 in response to one or more sensed parameters at a point of regulation (POR) at or near the load bus 16 (FIG. 1). The output voltage and/or current magnitudes developed at the POR may be regulated by suitably controlling the phase angle between the rectangular waveforms produced by the subinverter 30 relative to the subinverter 32. Inasmuch as this regulation scheme forms no part of the present invention, it will not be described in greater detail herein.

Referring now to FIG. 3, the subinverters 30, 32 and the summing transformer 34 are shown in greater detail. The subinverter 30 includes subinverter portions 60a–60c while the subinverter 32 includes subinverter portions 62a–62c. The portions 60a–60c and 62a–62c are coupled to primary winding sets 70a–70c and 72a–72c, respectively, of the summing transformer 34. A set of secondary windings 74a–74c are inductively coupled to the primary winding sets 70a–70c and 72a–72c.

The subinverter sections 60a–60c and 62a–62c are identical and hence only the inverter section 60a will be described in detail. The section 60a includes first, second and third switching networks 76-1, 76-2 and 76-3, wherein each switching network includes at least one, and preferably a pair of power switches in the form of power transistors Q1, Q2 and Q3, Q4 and Q5, Q6, respectively. Flyback diodes D1–D6 are coupled in antiparallel relationship across the power transistors Q1–Q6, respectively. A junction 78-1 between the power transistors Q1 and Q2 is coupled to a first end of a first primary winding 70a-1 of the winding set 70a. In like fashion, a junction 78-2 between the power transistors Q3 and Q4 is coupled to a first end of a second primary winding 70a-2 while a third junction 78-3 between the power transistors Q5 and Q6 is coupled to a first end of a third primary winding 70a-3 of the winding set 70a.

In a similar fashion, first ends of primary windings 70b-1, 70b-2 and 70b-3 are connected to junctions 80-1, 80-2 and 80-3 of the subinverter section 60b while first ends of the primary windings 70c-1, 70c-2 and 70c-3 are connected to junctions 82-1, 82-2 and 82-3 of the subinverter section 60c. Second ends of the windings 70a-1 through 70a-3, 70b-1 through 70b-3 and 70c-1 through 70c-3 are connected together at a junction 83 so that the winding sets 70a–70c are connected in a wye configuration.

Junctions 84-1 through 84-3 are coupled to first ends of primary windings 72a-1 through 72a-3 of the winding set 72a. Likewise, junctions 86-1 through 86-3 and 88-1 through 88-3 are coupled to first ends of primary windings 72b-1 through 27b-3 and 72c-1 through 72c-3, respectively, of the winding sets 72b, 72c. Second ends of the primary windings 72a-1 through 72a-3 are coupled to first ends of the primary windings 72b-1 through 72b-3, respectively. Similarly, second ends of the windings 72b-1 through 72b-3 are coupled to first ends of the windings 72c-1 through 72c-3 while second ends of these last windings are coupled to first ends of the windings 72a-1 through 72a-3. Thus, the windings 72a-1, 72b-1 and 72c-1 are connected in a delta configuration as are the windings 72a-2, 72b-2, 72c-2 and 72a-3, 72b-3, 72c-3.

In addition to the foregoing, the primary windings 70a-1 through 70a-3 and 72a-1 through 72a-3 are inductively coupled with the secondary windings 74a, while the windings 70b-1 through 70b-3 and 72b-1 through 72b-3 are inductively coupled with the secondary winding 74b. In like fashion, the windings 70c-1 through 70c-3 and 72c-1 through 72c-3 are inductively coupled with the secondary winding 74c. The secondary winding 74a, 74b and 74c are connected in a wye configuration between output lines 90a, 90b, 90c and a neutral conductor 90n.

The control unit 36 operates the switches Q1–Q6 of the subinverter section 60a together in synchronism to produce substantially identical rectangular waveforms in the primary windings 70a-1 through 70a-3. The switches in the subinverter section 60b are operated together in synchronism to produce substantially identical waveforms in the primary windings 70b-1 through 70b-3 wherein such waveforms are substantially identical to the waveforms developed in the windings 70a-1 through 70a-3, except phase displaced by 120° relative thereto. Further, the switches of the subinverter section 60c are operated together in synchronism to produce substantially identical rectangular waveforms in the primary windings 70c-1 through 70c-3 wherein such rectangular waveforms are substantially identical to the waveforms developed in the primary windings 70a-1 through 70a-3 except displaced 240° relative thereto.

Figure 5:
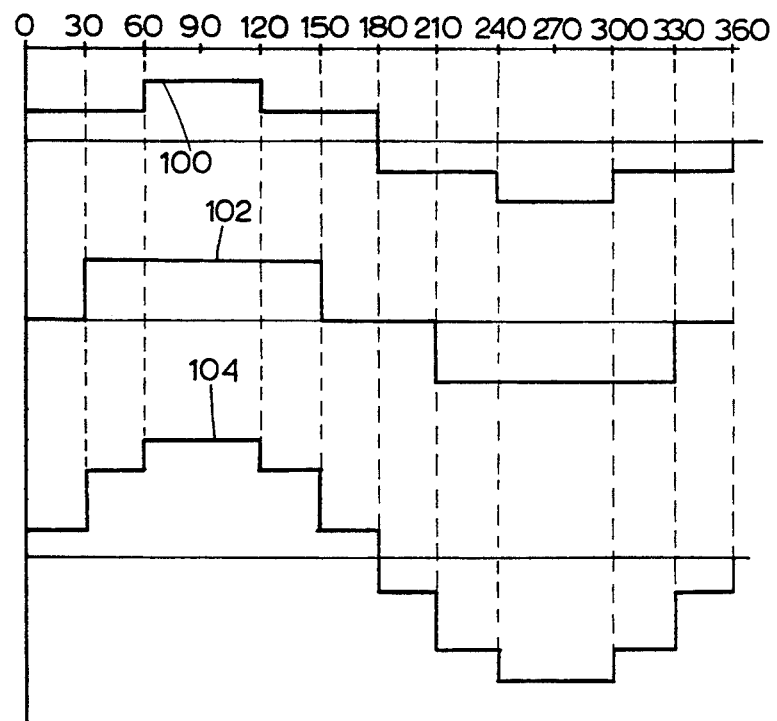
FIG. 5 is a waveform diagram illustrating the operation of the subinverters and summing transformer of FIGS. 2-4.

A representative one of the rectangular waveforms produced across the primary winding 70a-1 is shown as a waveform 100 in FIG. 5.

In a fashion similar to that described above, the switches of the subinverter section 62a are operated together in synchronism, as are the switches of the subinverter section 62b and the switches of the subinverter section 62c. A rectangular waveform 102 seen in FIG. 5 is induced across the windings 72a-1 through 72a-3. Rectangular waveforms substantially identical to the waveform 102, except displaced 120° with respect thereto, are produced across the windings 72b-1 through 72b-3, while substantially identical rectangular waveforms displaced 240° with respect to the waveform 102 are produced across the primary windings 72c-1 through 72c-3. The rectangular waveforms in the primary winding 70a and 72a are summed to produce a voltage across the winding 74a represented by a waveform 104 shown in FIG. 5. In like fashion, the rectangular waveforms in the winding sets 70b and 72b are summed to produce a voltage across the secondary winding 74b substantially identical to the waveform 104, except displaced 120° relative thereto while the rectangular waveforms in the winding sets 70c and 72c are summed to produce a voltage across the secondary winding 74c substantially identical to the waveform 104, except displaced 240° relative thereto.

Figure 4:
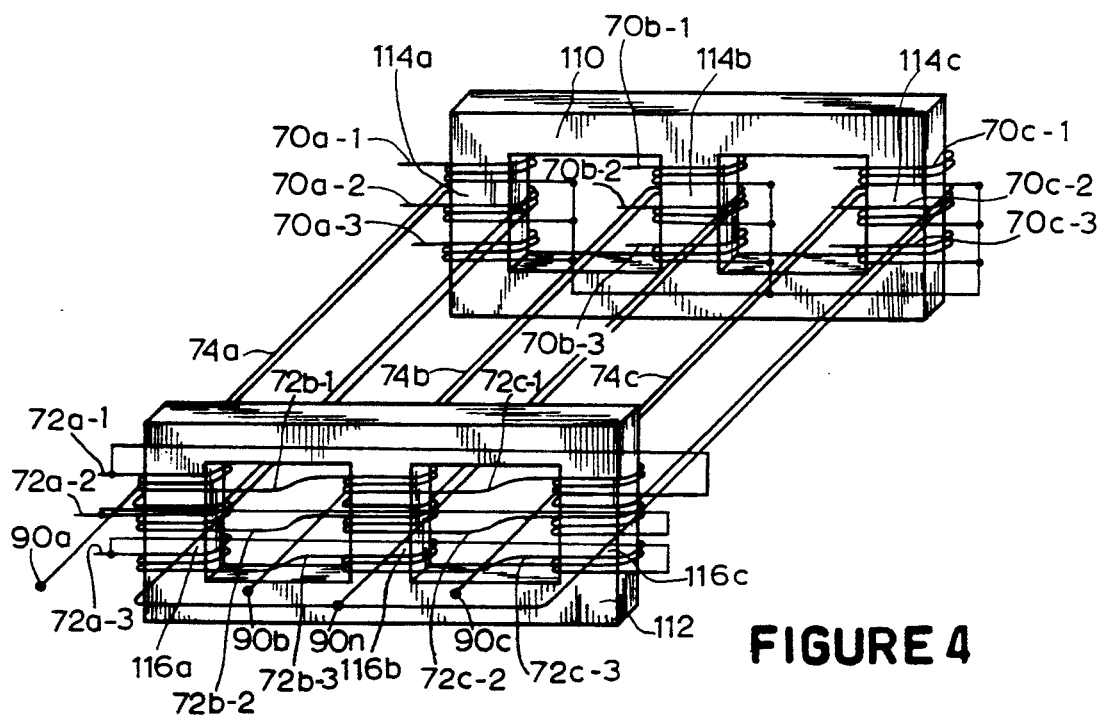
FIG. 4 is an exploded perspective view of the summing transformer of FIGS. 2 and 3.

FIG. 4 illustrates the mechanical design of the transformer 34 of FIG. 3 in greater detail. The transformer 34 includes first and second cores 110, 112 each having three legs 114a–114c and 116a–116c, respectively. The windings 70a-1 through 70a-3 are wound on the leg 114a while the windings 70b-1 through 70b-3 and 70c-1 through 70c-3 are wound on the legs 114b, 114c, respectively. The windings 72a-1 through 72a-3, 72b-1 through 72b-3 and 72c-1 through 72c-3 are disposed on the legs 116a–116c, respectively, of the core 112. The cores 110, 112, which may be fabricated of laminated iron, provide closed flux paths which mutually inductively couple the windings of each winding set 70a–70c and 72a–72c.

The secondary winding 74a is wound about the first legs 114a, 116a of the cores 110, 112. The winding 74b is wound about the legs 114b, 116b while the winding 74c is wound about the legs 114c, 116c. Thus, as previously mentioned, the secondary windings are inductively linked with the primary windings of the summing transformer 34.

As should be evident from the foregoing discussion, the switch pairs of the subinverter sections 60a–60c and 62a–62c are effectively connected together in parallel such that each switch pair provides only a fraction of the total output power of the inverter. In the illustrated embodiment, the switches Q1, Q2 supply only a third of the output power supplied by the subinverter section 60a. Thus, the controllable power switches may have a lower rating than if they were to supply the entire output power of the inverter.

While each subinverter section has been shown as including three switch networks, it should be noted that a different number of switch networks may instead be provided such as 2, 4, 5, etc. Also, as noted above, a different number of phases may be produced by the inverter 24, in which case a greater or lesser number of subinverter sections would be provided in each subinverter 30, 32. Still further, instead of the 12-step inverter illustrated in FIG. 3, an inverter that produces a different number of steps in the inverter output may be employed. For example, if a 24-step inverter were desired, two additional subinverters identical to the subinverters 30, 32 and two winding sets identical to the winding sets 70a–70c and 72a–72c would be utilized wherein the outputs of one of the subinverters would be coupled to one of the winding sets connected in a wye configuration while the winding sets coupled to the other subinverter would be connected in a delta configuration. By adding more subinverter pairs and winding sets, 36-step, 48-step or a different number of step waveforms can be obtained.

The summing transformer 34 not only prevents DC power produced at the output of the subinverters 30, 32 from reaching the load but also produces a neutral voltage on the line 90n without the need for a separate neutral forming transformer. Thus, when the inverter 24 is to be of the full-bridge type, a separate neutral forming transformer is not required, and hence size and weight can be reduced.

While the present invention has been shown in connection with an inverter of the stepped waveform type, it should be noted that the outputs of any two switches may be connected in parallel using the techniques disclosed herein. In this case, first ends of inductively mutually coupled first and second windings are connected to first and second switches, respectively. Second ends of the windings may be connected together and the switches may be operated together in synchronism such that switch currents conducted by the switches are summed at the second ends of the windings. The mutual coupling of the windings ensures that the switch currents are substantially equal so that current sharing problems are avoided. In an alternative embodiment, a secondary winding may be wound on a core with the first and second windings and may be inductively coupled thereto. Again, the switches are operated together in synchronism so that each conducts a portion of the output power developed in the secondary winding.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A switching converter, comprising:
   first and second controllable switches;
   a power source coupled to the switches;
   a closed flux path;
   first and second primary windings mutually inductively coupled through the closed flux path wherein the first and second primary windings have first ends coupled to the first and second switches, respectively, and second ends that are coupled together at a junction;
   means coupled to the switches for operating the switches together in synchronism wherein each switch conducts a switch current between the power source and the junction and wherein the switch currents are summed at the junction; and
   a secondary winding inductively coupled with but electrically isolated from the first and second primary windings through the closed flux path.

2. The switching converter of claim 1, further including third and fourth switches coupled between the power source and third and fourth primary windings wherein the third and fourth primary windings are mutually inductively coupled through a further closed flux path and wherein the operating means operates the third and fourth switches together in synchronism.

3. The switching converter of claim 2, wherein the secondary winding is inductively coupled with the third and fourth primary windings through the further closed flux path.

4. The switching converter of claim 3, wherein the first-named closed flux path is disposed in a first core and the further closed flux path is disposed in a second core.

5. The switching converter of claim 2, wherein the third and fourth primary windings are coupled together at the junction and further including an additional secondary winding inductively coupled with the third and fourth primary windings through the further closed flux path.

6. The switching converter of claim 5, wherein the first-named closed flux path is disposed in a first portion of a core and the further closed flux path is disposed in a second portion of the core.

7. The switching converter of claim 2, wherein the third and fourth switches are operated at a particular phase displacement with respect to the first and second switches.

8. A switching converter, comprising:
   a power source;
   first and second switches coupled to the power source;
   a transformer having first and second primary windings wound on and mutually inductively coupled by a core and coupled to the first and second switches, respectively, and a secondary winding wound on the core wherein the secondary winding is inductively coupled to but electrically isolated from the primary windings; and
   a switch controller that operates the switches together in synchronism whereby the first and second switches couple the power source to the first and second primary windings and produce first and second powers therein, respectively, and wherein the first and second powers are summed in the secondary winding.

9. The switching converter of claim 8, further including third and fourth switches coupled between the power source and third and fourth windings wherein the third and fourth windings are wound on and mutually inductively coupled by a further core wherein the switch controller operates the third and fourth switches together in synchronism.

10. The switching converter of claim 9, wherein the third and fourth switches are operated at a particular phase displacement with respect to the first and second switches.

11. A stepped waveform inverter, comprising:
   first through twelfth controllable switches arranged in six switch pairs;
   first through twelfth primary windings having first and second ends wherein the first ends of the first through twelfth primary windings are coupled to the first through twelfth switches, respectively, the second ends of the first through sixth primary windings are connected together, the second end of each of the seventh through ninth primary windings is connected to the first end of one of the seventh through ninth primary windings and the second end of each of the tenth through twelfth primary windings is connected to the first end of one of the tenth through twelfth primary windings;
   means for mutually inductively coupling the first and second primary windings together, the third and fourth primary windings together, the fifth and sixth primary windings together, the seventh and eighth primary windings together, the ninth and tenth primary windings together and the eleventh and twelfth primary windings together;

first, second and third secondary windings disposed on the coupling means wherein the coupling means inductively couples the first through third secondary windings to the first through twelfth primary windings; and means for operating the switches of each switch pair together in synchronism whereby rectangular waveforms are produced in the primary windings and the rectangular waveforms are summed in the secondary windings.

12. The stepped waveform inverter of claim 11, wherein the coupling means comprises first and second core sections each including first, second and third legs wherein a pair of windings is wound on each leg.

13. The stepped waveform inverter of claim 12, wherein the first, second and third secondary windings are wound about a leg of the first core section and a leg of the second core section.

14. A summing transformer, comprising:

first and second cores each having first, second and third legs;

a pair of primary windings disposed on each leg of the cores wherein the primary windings of each pair disposed on the first core have first ends adapted to receive AC power and second ends coupled to one another and wherein a first primary winding of each pair disposed on the second core is connected in a delta configuration with the first primary windings of the remaining pairs disposed on the second core and a second primary winding of each pair disposed on the second core is connected in a delta configuration with the second primary windings of the remaining pairs disposed on the second core and wherein junctions between the first primary windings and junctions between the second primary windings disposed on the second core are adapted to receive AC power; and first, second and third secondary windings disposed on the first, second and third legs of the first and second cores, respectively.

15. The summing transformer of claim 14, in combination with an inverter having twelve switches coupled to the primary windings wherein the switches coupled to each pair of primary windings are operated together in synchronism and produce rectangular waveforms in the primary windings and wherein the rectangular waveforms are summed in the secondary windings.

* * * * *